United States Patent
Campbell et al.

(10) Patent No.: US 6,527,992 B2
(45) Date of Patent: Mar. 4, 2003

(54) FOAM TRANSFER METHOD FOR MAKING FORMED LAMINATE

(76) Inventors: Travis J. Campbell, 2870 Benstein Rd., Commerce, MI (US) 48390; Richard John Gutierrez, 9644 Buckingham Rd., White Lake, MI (US) 48386; Christian Thary, 5199 Shenandoah Ct., West Bloomfield, MI (US) 48323

( * ) Notice: Subject to any disclaimer, the term of this patent is extended or adjusted under 35 U.S.C. 154(b) by 110 days.

(21) Appl. No.: 09/823,713

(22) Filed: Mar. 31, 2001

(65) Prior Publication Data

US 2002/0170657 A1 Nov. 21, 2002

(51) Int. Cl.[7] .............................................. B29C 44/06
(52) U.S. Cl. ...................................... 264/46.4; 264/321
(58) Field of Search .......................... 156/78, 230–241, 156/247, 289; 264/46.4, 321; 427/146, 244

(56) References Cited

U.S. PATENT DOCUMENTS

| | | | |
|---|---|---|---|
| 5,273,698 A | * | 12/1993 | Thary ........................ 264/46.4 |
| 5,296,182 A | * | 3/1994 | Thary ........................ 264/46.5 |
| 5,840,224 A | * | 11/1998 | Thary ........................ 264/46.4 |

* cited by examiner

*Primary Examiner*—Michael W. Ball
*Assistant Examiner*—Barbara J. Musser

(57) ABSTRACT

A method and apparatus for making a formed laminate (20) discloses an applicator (42) for depositing a quick reacting foamable liquid mixture (36) onto a transfer member (38) from which the reacted foam (40) and any foamable liquid mixture that has yet to react is transferred onto a flexible sheet (28). Relative movement of a pair of contoured mold surfaces (74,76) of a mold (68) toward each other compresses the flexible sheet (28) and the foam while the foam is in a transitory state (41) after substantial completion of expansion and before substantial curing has taken place such that it is still viscous. This compression provides a collapsed foam layer (30) and forms the foam as well as the flexible sheet (28) to provide the formed laminate (20). A liner (32) is also provided on the opposite side of the collapsed foam as the flexible sheet.

12 Claims, 4 Drawing Sheets

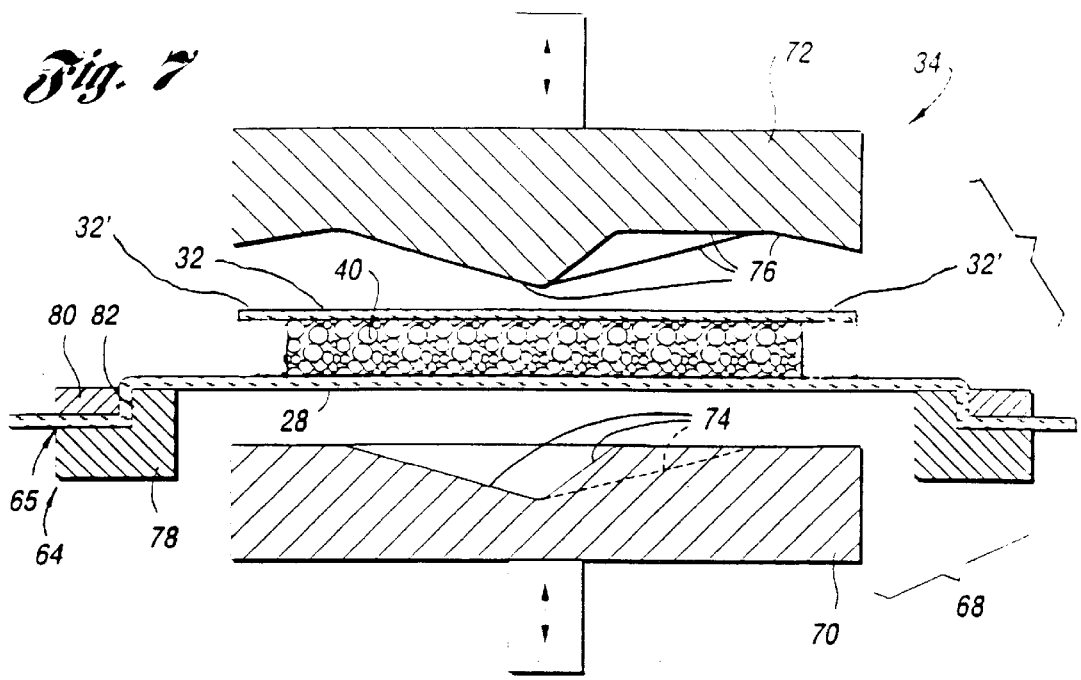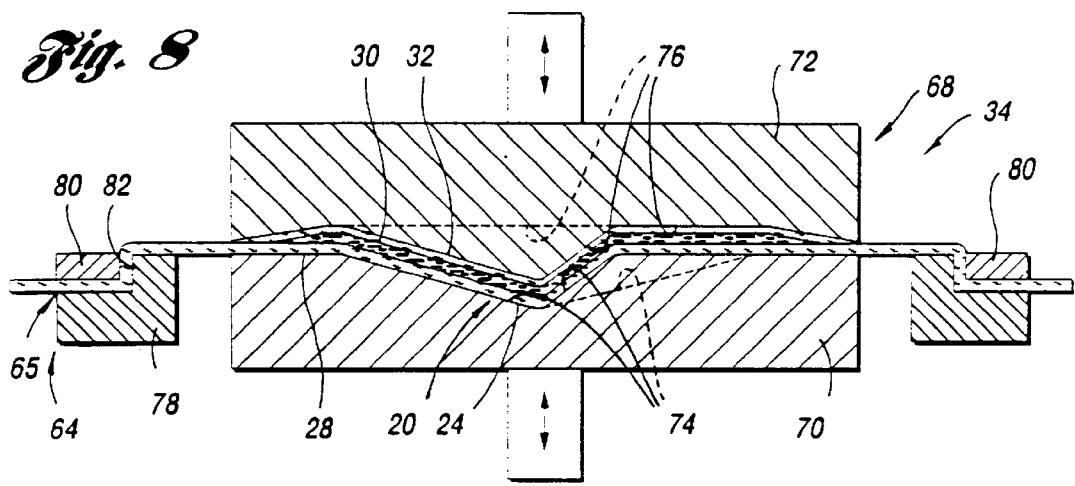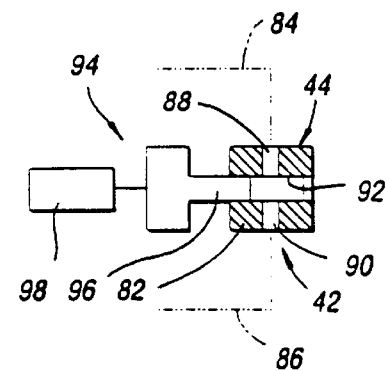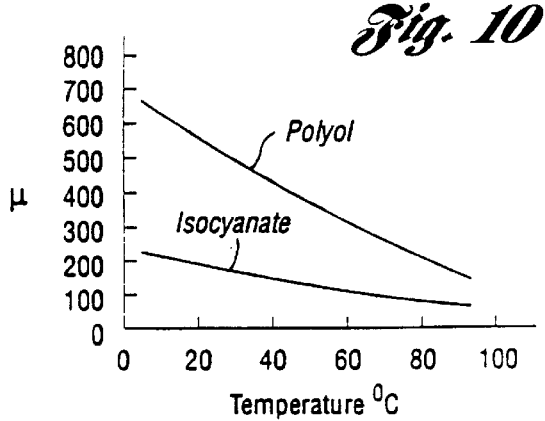

FOAM TRANSFER METHOD FOR MAKING FORMED LAMINATE

TECHNICAL FIELD

This invention relates to a foam transfer method and apparatus for making a formed laminate.

BACKGROUND ART

U.S. Pat. No. 5,273,698 Thary discloses a method for shaping cover materials wherein a flexible sheet-like cover material and a foamable liquid reaction mixture are positioned within a mold having surface contours such that closing of the mold after the foam layer has substantially completed its expansion but is still in its viscous liquid state compresses the foam layer and shapes the cover material such that subsequent curing of the foam layer to a solid state within the mold along with the shaped cover material provides a shaped cover.

U.S. Pat. No. 5,296,182 Thary discloses a method for making a formed laminate by positioning a flexible sheet and a film in a vertically spaced relationship to each other and providing a foamable liquid mixture for reaction and expansion between the flexible sheet and the film which are compressed between first and second contoured mold surfaces while the foam is in a transitory state after substantial completion of its expansion but before substantial curing such that the compression provides a formed laminate.

Also, slab stock foam has previously been compressed to provide greater strength such as for carpet padding, to control the size of cells such as for use as a filtering media, and to provide localized compressed area such as for reinforcement for fasteners. Such prior art and other foam prior art are disclosed by U.S. Pat. No. : 3,228,284 Reeves; U.S. Pat. No. 3,058,161 Beyer et al.; U.S. Pat. No. 3,243,485 Griffen; U.S. Pat. No. 3,506,600 Zocco et al.; 3,622,435 Cacella; U.S. Pat. No. 3,650,993 Zocco et al.; U.S. Pat. No. 3,709,966 Gambardella; U.S. Pat. No. 3,867,320 Gambardella et al.; U.S. Pat. No. 3,880,977 Gealer et al.; U.S. Pat. No. 3,929,948 Welch et al.; U.S. Pat. No. 3,959,049 Tanaka et al.; U.S. Pat. No. 3,978,266 Lock; U.S. Pat. No. 3,978,855 McRae et al.; 3,989,781 Chant; U.S. Pat. No. 4,059,660 Roth et al.; U.S. Pat. No. 4,096,303 Doerfling; U.S. Pat. No. 4,180,631 Yukuta et al.; U.S. Pat. No. 4,228,076 Pettingell; U.S. Pat. No. 4,241,189 Sheldon et al.; U.S. Pat. No. 4,246,361 Yukuta et al.; U.S. Pat. No. 4,265,965 Chancler; U.S. Pat. No. 4,278,482 Poteet et al.; 4,304,810 Gates et al.; U.S. Pat. No. 4,312,672 Blahak et al.; 4,389,358 Hendry; U.S. Pat. No. 4,443,286 Ikeda et al.; U.S. Pat. No. 4,465,388 Iwasawa; U.S. Pat. No. 4,508,774 Grabhoefer et al.; U.S. Pat. No. 4,513,518 Jalbert et al.; U.S. Pat. No. 4,515,646 Walker et al.; U.S. Pat. No. 4,600,461 Guy; U.S. Pat. No. 4,656,906 Mozieka et al.; U.S. Pat. No. 4,668,557 Lakes; U.S. Pat. No. 4,715,912 Tillotson; U.S. Pat. No. 4,740,256 Vosberg; U.S. Pat. No. 4,770,827 Fischer; U.S. Pat. No. 4,781,774 Steward et al.; U.S. Pat. No. 4,789,584 Perrin; U.S. Pat. No. 4,804,425 Hoffmann et al.; U.S. Pat. No. 4,810,316 Wakabayashi et al.; U.S. Pat. No. 4,816,494 Watson, Jr. et al.; U.S. Pat. No. 4,828,238 Mozieka et al.; U.S. Pat. No. 4,850,579 Fisher; U.S. Pat. No. 4,877,814, Ito; U.S. Pat. No. 4,878,972 Kaneko et al.; U.S. Pat. No. 5,032,622 Herrington et al.; U.S. Pat. No. 5,037,591 Rohriach et al.; U.S. Pat. No. 5,112,542 Beer; and U.S. Pat. No. 5,132,063 Hughes. See also foreign patent documents Japan 60-13530 dated January 1985 and United Kingdom 1214366 dated December 1970.

DISCLOSURE OF INVENTION

An object of the present invention is to provide an improved foam transfer method and apparatus for making a formed laminate.

In carrying out the above object of the invention, the method for making a formed laminate is performed by depositing a quick reacting foamable liquid mixture onto a transfer member for reaction that causes expansion to provide a foam which subsequently cures but which, after substantial completion of the expansion and before substantial curing has taken place, has a transitory state when the liquid mixture is viscous and defines cells enclosing the gas generated during the expansion stage of the reaction. The reacted foam and any foamable liquid mixture that has not yet reacted is then transferred from the transfer member onto a flexible sheet. Relative movement is then provided of a pair of contoured mold surfaces toward each other with the flexible sheet and foam therebetween while the foam is in the transitory state such that the foam is collapsed and formed with the flexible sheet to the contoured shapes of the mold surfaces as the collapsed foam is bonded to the flexible sheet to provide the formed laminate.

As disclosed, the flexible sheet utilized is cloth and is specifically disclosed as an article of clothing such as a T-shirt.

The preferred manner for depositing the foamable liquid mixture is by spraying thereof onto the transfer member.

In addition, the method is also disclosed as being performed by providing a liner located over the foam after the transfer thereof to the flexible sheet. The liner as well as the flexible sheet are formed and bonded to the collapsed foam by the contoured mold surfaces. It is preferably for the liner to extend beyond the foam on the flexible sheet to prevent the subsequently collapsed foam from extending outwardly past the liner.

In the preferred practice disclosed, the method is performed by initially applying printed matter to the flexible sheet before the forming thereof with the foam to provide the formed laminate. This printed matter is most preferably provided by a heat transfer process.

As disclosed, the flexible sheet is clamped around the foam received thereby with a clamping pressure that permits the flexible sheet to slide at the locations of clamping during the forming thereof by the contoured mold surfaces.

A slight pressure is applied to the foam by the transfer member to provide partial collapse thereof against the flexible sheet to facilitate the transfer thereof to the flexible sheet from the transfer member. Also, a release agent is applied to the transfer member prior to receiving the foamable liquid mixture to facilitate the transfer of the foam to the flexible sheet.

In carrying out the objects of the invention, the apparatus for making a formed laminate includes an applicator for supplying a quick reacting foamable liquid mixture for reaction that causes expansion to provide a foam which subsequently cures but which, after substantial completion of the expansion and before substantial curing has taken place, has a transitory state when the liquid mixture is viscous and defines cells enclosing the gas generated during the expansion stage of the reaction. A transfer member of the apparatus receives the foamable liquid mixture from the applicator. A frame of the apparatus supports a flexible sheet to which reacted foam and any foamable liquid mixture that has not yet reacted is transferred from the transfer member. A mold of the apparatus includes a pair of mold members that have associated contoured mold surfaces that are relatively movable toward each other with the flexible sheet and the foam therebetween while the foam is in the transitory state such that the foam is collapsed and formed with the flexible sheet to the contoured shapes of the mold surfaces as the collapsed foam is bonded to the flexible sheet to provide the formed laminate.

In the preferred construction of the apparatus, the applicator is a sprayer that sprays the quick reacting foamable liquid mixture onto the transfer member. Also, the transfer member is preferably made from plastic and has a planar surface that receives the foamable liquid mixture, and this planar surface has a periphery including a sharp bevel.

The frame of the apparatus preferably includes a clamp that clamps the flexible sheet but permits the flexible sheet to slide during the forming thereof by the contoured mold surfaces.

The objects, features and advantages of the present invention are readily apparent from the following detailed description of the best mode for carrying out the invention when taken in connection with the accompanying drawings.

BRIEF DESCRIPTION OF THE DRAWINGS

FIG. 7 illustrates a further stage where the clamped flexible sheet and the foam with a liner over the foam are positioned between contoured mold surfaces of an open mold;

FIG. 8 is a view of a still further stage where the mold is closed after moving the contoured mold surfaces toward each other to collapse the foam and provide the formed laminate;

FIG. 9 is a schematic view illustrating a sprayer that embodies the applicator for supplying the quick reacting foamable liquid mixture utilized to make the formed laminate;

FIG. 10 is a graphical view illustrating the viscosity of the polyol and the isocyanate that are mixed by the sprayer type applicator to provide the quick reacting foamable liquid mixture;

BEST MODE FOR CARRYING OUT THE INVENTION

Figure 1:
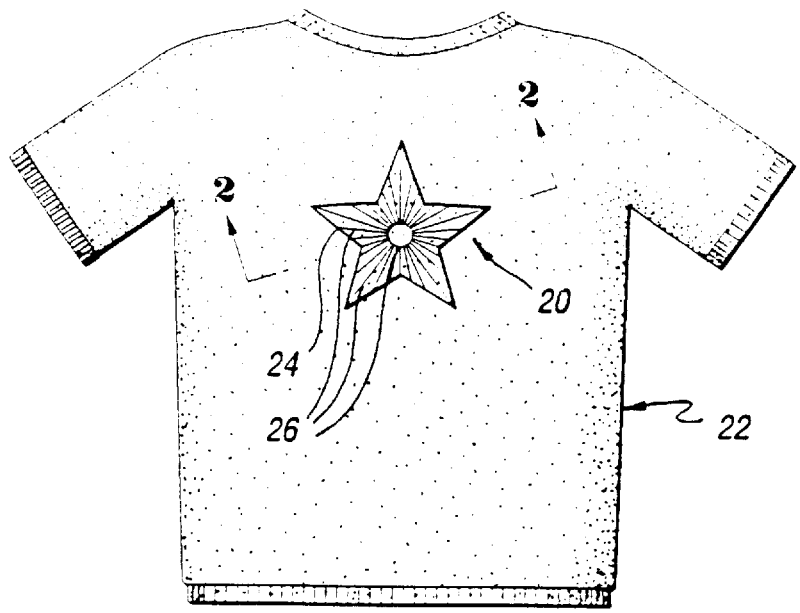
FIG. 1 is a front view of a formed laminate that is made by the method and apparatus of this invention and shown as a garment embodied by a T-shirt.
Figure 2:
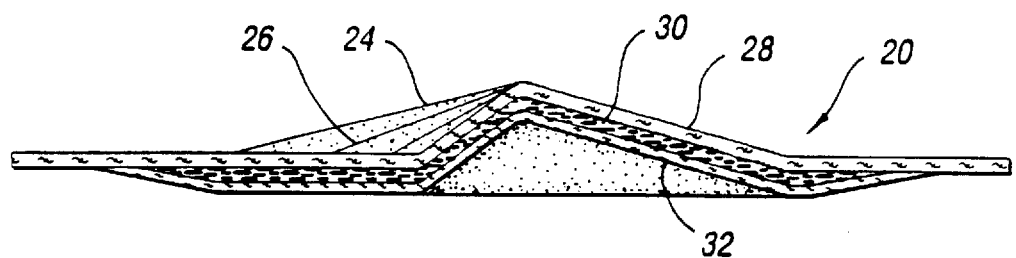
FIG. 2 is a sectional view through the formed laminate taken along the direction of line 2—2 in FIG. 1.
Figure 3:
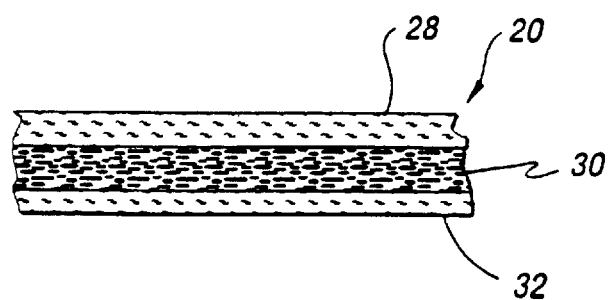
FIG. 3 is a partial enlarged view of the cross-section of the formed laminate.

With reference to FIGS. 1 and 2 of the drawings, a formed laminate 20 is made by the method and apparatus of this invention as is hereinafter more fully described in an integrated manner with respect to both the method and the apparatus.

As illustrated in FIG. 1, the formed laminate 20 is three-dimensionally contoured as part of an article of apparel embodied by a T-shirt 22. The formed laminate is specifically illustrated as a raised star 24 having printed matter 26 thereon in the form of the outline of the star, a central round circle at the center of the star, and lines that radiate out from the circle. This printed matter may of course take other forms such as alpha numeric indicia, pictorial depictions, or a combination thereof, etc. As shown in FIG. 2, the formed laminate 20 includes a flexible sheet 28 which is embodied by porous cloth of the T-shirt and also includes a collapsed foam layer 30 bonded to the flexible cloth sheet. In addition, the formed laminate preferably includes a liner 32 on the backside of the collapsed foam layer 30 such that a person wearing the T-shirt 22 is not contacted by the foam. The construction of the raised star 24 has oppositely oriented curvatures which can be formed without wrinkling of the flexible cloth sheet 28 due to the manner in which the foam and cloth are compressed during forming of the laminate as is hereinafter more fully described.

The method and apparatus of the invention are illustrated in FIGS. 4–8 with the apparatus generally designated by 34 in all of the views which collectively show different components thereof as is hereinafter more fully described.

Figure 4:
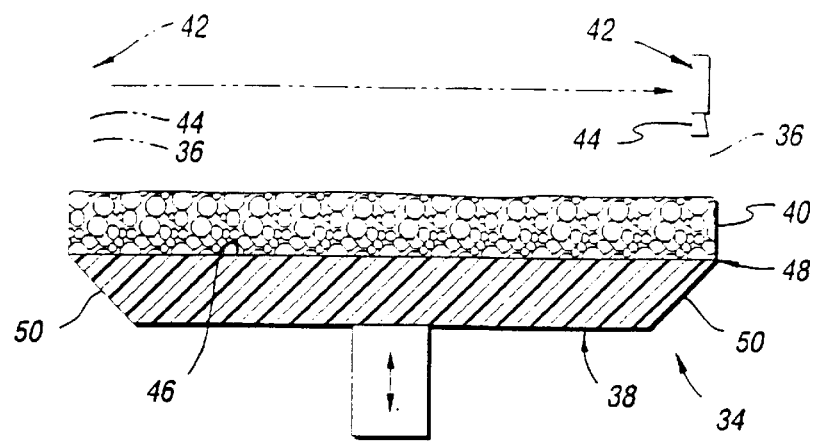
FIG. 4 is a view taken partially in section illustrating the matter in which an applicator of the apparatus deposits a quick reacting foamable liquid mixture onto a transfer member.
Figure 11:
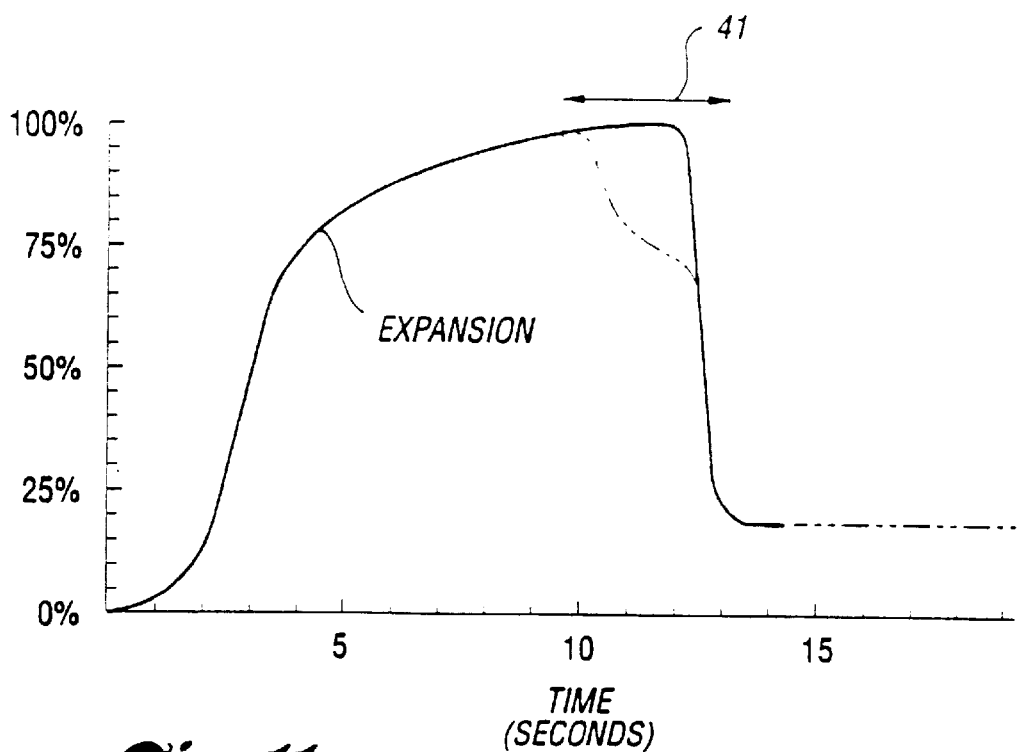
FIG. 11 is a view that illustrates the expansion and subsequent compression of the foam as the formed laminate is made by the method and apparatus.
Figure 12:
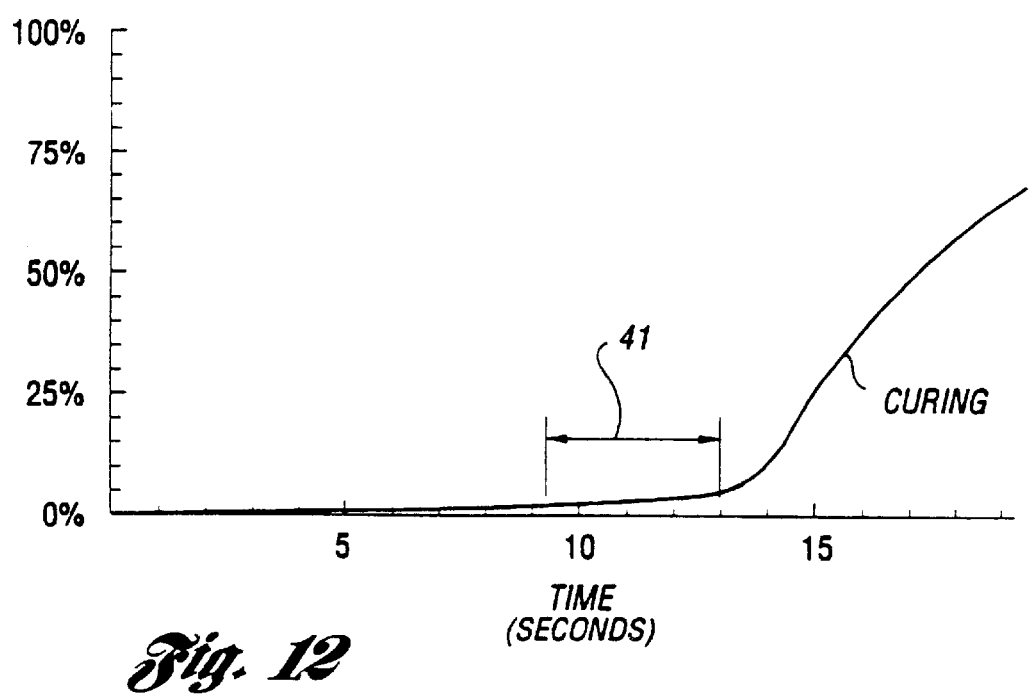
FIG. 12 is a view that illustrates the rate of foam curing.

As specifically shown in FIG. 4, the method for making the formed laminate commences by depositing a quick reacting foamable liquid mixture 36 onto a transfer member 38 for reaction that causes expansion to provide a foam 40. As shown in FIGS. 11 and 12, the foamable liquid mixture is of the quick reacting type that fully expands in less than 25 seconds and preferably less than 15 seconds to provide the expanded foam which subsequently cures but which after substantial completion of the expansion and before substantial curing takes place has a transitory state 41 when the liquid mixture is viscous and defines cells enclosing the gas generated during the expansion stage of the reaction. Both forming of the foam, as is hereinafter described, and the curing of the foam take place without the need for any additional heating with the quick reacting foamable liquid mixture utilized.

As illustrated in FIG. 4, the deposition of the quick reacting foamable liquid mixture is preferably provided by an applicator 42 of the apparatus which is most preferably constructed as a sprayer 44 for spraying the foamable liquid mixture 36 onto the transfer member 38. This transfer member 38 is generally rigid and is preferably made from plastic such as polyethylene. A planar surface 46 of the transfer member 38 faces upwardly to receive the foamable liquid mixture 36 as a downward spray from the sprayer type applicator 42. This planar surface 46 has a periphery 48 that is shaped to the configuration of the formed laminate to be made such as the star previously described. Periphery 48 of the transfer member surface 46 preferably has a sharp bevel 50 which defines an included angle with the surface in the range of about 35° to 55° and most preferably about 45°. This bevel 50 causes any excess liquid foamable mixture to fall downwardly to ensure that the expanded foam 40 is accurately shaped to the configuration of the formed laminate to be made. The shape of the transfer member 38 with the sharp bevel 50 can be made in any suitable way such as by cutting from flat stock; however, when a large number of the transfer members are required for substantial production, the transfer members can be more economically made as injection moldings with the peripheral bevel.

Figure 5:
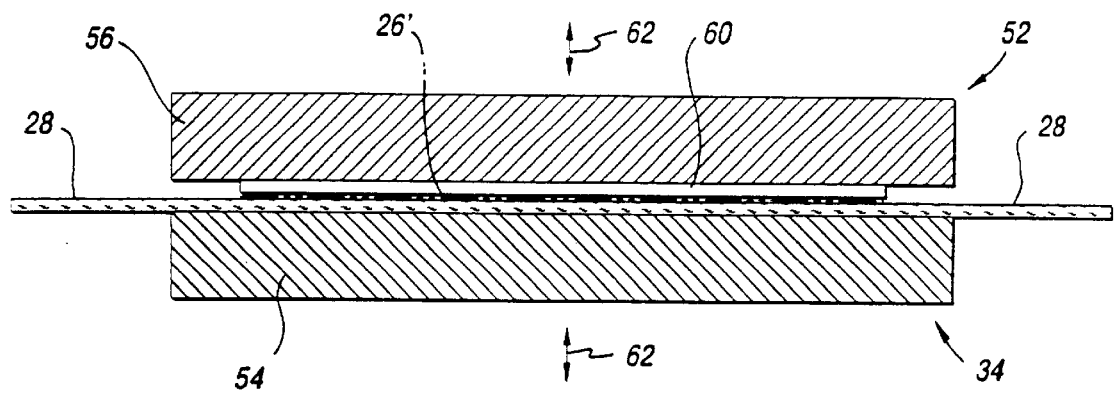
FIG. 5 is a sectional view that illustrates the application of printed matter onto a flexible sheet by a heat transfer process in accordance with the preferred practice of the method.

As illustrated in FIG. 5, the printing on the flexible cloth sheet 28 is performed by a printer 52 of the apparatus 34 before the forming of the formed laminate such that the flexible cloth sheet is then generally planar as illustrated. This printer 52 includes a pair of opposed platens 54 and 56 and is preferably of the heat transfer type including a suitable heater 60 mounted on one platen, the upper platen 56 as shown. The flexible cloth sheet 28 is positioned between the platens 54 and 56 and a heat transfer decal 26' is positioned on the side thereof adjacent the heater 60. Movement of the platens 54 and 56 toward each other in the direction shown by arrows 62 transfers the printed matter from the decal 26' onto the flexible cloth sheet by a conventional heat transfer process.

Figure 6:
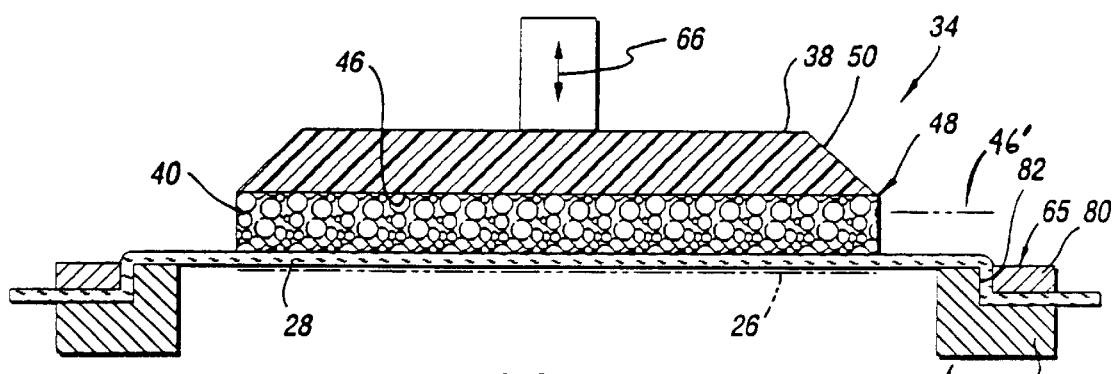
FIG. 6 is a sectional view that illustrates the manner in which the transfer member transfers the foam to the flexible sheet with the printed matter facing downwardly and with the flexible sheet clamped by a clamp of a frame of the apparatus.

With reference to FIG. 6, a frame 64 of the apparatus 34 includes a clamp 65 that clamps the flexible cloth sheet 28 with its printed matter 26 facing downwardly while in a generally taut condition so as to define a generally planar shape. The reacted foam and any foamable liquid mixture that has not yet reacted is then transferred from the transfer member 38 to the upper side of the flexible cloth sheet 28 within the confines of the frame 64 by turning the transfer member over from its FIG. 4 position and then moving the transfer member downwardly in the direction shown by arrows 66 toward the flexible cloth sheet. The transfer member 38 is then moved upwardly away from the clamped flexible cloth sheet 28 while the foam remains adhered to the upper side thereof opposite the downwardly facing printed matter 26. It should be noted that the foamable liquid mixture by the time of transfer has had sufficient time to substantially expand to the foam such that the surface tension of the expanded foam bubbles, even though still viscous, prevents permeation thereof into the porous cloth layer 28. Also, the time that transpires before the transfer results in an increase in viscosity due to the small amount of curing that takes place such that permeation into the porous cloth layer 28 is further prevented.

After the transfer of the foam 40 from the transfer member 38 to the flexible cloth sheet 28, the liner 32 such as a sheet of fleeced cloth is located over the foam as shown in FIG. 7 so that the foam is sandwiched between the flexible cloth sheet and the liner. This liner 32 preferably extends beyond the foam as shown at 32' such that the foam upon subsequent collapse as is hereinafter described is not squeezed outwardly enough so as to extend outwardly past the liner. The frame 64 is then positioned as shown in FIG. 7 to locate the flexible cloth sheet 28 clamped thereby, the foam 40 and the liner 32 within an open mold 68 of the apparatus 34. This mold 68 includes lower and upper mold members 70 and 72 that are located respectively below and above the clamped flexible cloth sheet 28, the foam 40, and the liner 32. These mold members 70 and 72 have a pair of contoured mold surfaces 74 and 76 that oppose each other from below and above the clamped flexible cloth sheet 28, the sandwiched foam 40 and the liner 32.

Mold closing by suitable actuated relative movement of the mold members 70 and 72 toward each other from the position of FIG. 7 to the position of FIG. 8 provides relative movement of the pair of contoured mold surfaces 74 and 76 toward each other after substantial completion of the foam expansion and before substantial curing has taken place with the foam in its transitory state when the liquid mixture is still viscous and defines cells enclosing the gas generated during the expansion stage of the reaction. The mold closing upon movement from the position of FIG. 7 to the position of FIG. 8 collapses the foam 40 and forms the foam as well as the flexible cloth sheet 28 and the liner 32 to the contoured shapes of the mold surfaces 74 and 76, such as in the shape of the star previously described, as the collapsed foam is bonded to the flexible cloth sheet and to the liner to provide the formed laminate previously described. Thereafter relative movement of the mold members 70 and 72 back to the open position of the mold 68 as shown in FIG. 7 permits removal of the formed laminate from the mold.

The contoured mold surfaces 74 and 76 are normally generally complementary to each other to provide a generally uniform thickness of the collapsed foam layer 30. However, for some applications, it may be desirable for the collapsed foam layer to have different thicknesses in selected areas and the mold surfaces will then be configured accordingly.

As illustrated in FIGS. 6–8, the frame clamp 65 for the flexible cloth sheet 28 includes a pair of clamp members 78 and 80 which extend within continuous constructions entirely around the foam received by the sheet for the forming. More specifically, the one clamp member 78 has an outer formation 82 that receives the other clamp member 80 and the sizing therebetween is such as to permit clamping of the flexible cloth sheet 28 while permitting sliding thereof at the clamped locations during the forming as previously described in connection with FIGS. 7 and 8. As such, the sliding of the flexible cloth sheet 28 through the frame 64 provides the necessary extent of the cloth sheet to form it from the planar shape to the formed shaped such as the star previously described.

Upon transferring the foam 40 as shown in FIG. 7, it is preferable to apply a slight downward pressure to the transfer member 38 which moves its surface 46 downwardly to the phantom line 46' shown to partially collapse the foam. The partial foam collapse generates gas at the transfer member surface 46 to separate the foam from the transfer member and thereby facilitate the transfer of the foam to the flexible cloth sheet 28. When this partial collapse is utilized, the foam initially expands and the subsequent collapse follows the phantom line path of FIG. 11.

The compression of the foam including the compression provided by the transfer member 38 as well as by the mold surfaces 74 and 76 should not be performed until substantially all of the expansion, i.e. 90% and most preferably 95%, has taken place so that the force that compresses and collapses the foam and forms the laminate does not have to counteract the expansion as the gas is generated. However, the compression of the foam has to be performed before substantial curing has taken place so that the foam is still fragile, i.e. the cellular walls in which the gas is located must be still viscous such that the larger gas bubbles burst even though the smaller ones do not due to the surface tension of the cellular walls. The extent of the foam collapse is somewhat localized such that the compression must be performed over the entire extent of the formed laminate.

It should also be noted that it is preferable to provide a release agent to the planar surface 46 of the transfer member 38 so that the foam 40 is further more easily released therefrom upon transfer to the flexible cloth sheet 28 upon upward movement of the transfer member from the position shown in FIG. 6. A release agent that works well with the transfer member 38 when made from plastic such as polyethylene as described above is a liquid mixture of 90% by weight of mineral spirits and 10% by weight of silicone resin that is spread over the surface. Such a release agent functions effectively for numerous cycles such as for on the order of a full day of use.

As illustrated in FIG. 9, the sprayer 44 that embodies the applicator 42 includes a dispensing head 82 that is supplied polyol and isocyanate through respective supply conduits 84 and 86. More specifically, the dispensing head has inlets 88 and 90 to which the polyol and isocyanate supply lines 84 and 86 are connected, and these inlets are communicated with a spray bore 92 that is controlled by a valve 94. This valve 94 includes a valve element 96 and a valve operator 98 that controls the valve element. More specifically, the valve operator 98 moves the valve element 96 between the open position where the polyol and isocyanate under pressure are communicated with the spray bore 92 to provide a spray toward the right open end of the spray bore 92 and a closed position to the right of the open position such that the inlets 88 and 90 are isolated from the spray bore 92 after the spraying is completed. It should also be mentioned that it is possible to utilize a conventional recirculating type of spray head so that there is no need to do a prespray in order to make sure that each of the sprayed components is at the proper temperature as is hereinafter more fully described.

In order to effectively spray the foamable liquid mixture, it is necessary for the dynamic viscosity of the foamable liquid mixture to be below about 160 centipoise. Both the polyol and isocyanate as shown in FIG. 10 must be heated to higher than room temperature in order to have such a sufficiently low viscosity so that spraying can take place. More specifically, the polyol is heated to a temperature of about 85° centigrade and is pressurized to a pressure of about 110 bars as well as having approximately 3 to 7 parts by weight of water added, which is an excess of water needed for the foam reaction and thereby reduces the viscosity so that spraying can take place. Furthermore, the isocyanate is heated to a temperature of about 70° centigrade and is pressurized to a pressure of about 95 bars so that spraying can take place.

A specific example of a formulation utilized to provide soft foam involved is:

| SOFT FOAM FORMULATION EXAMPLE | |
|---|---|
| Polyol Mixture | Parts by Weight |
| *Polyether polyol RUBINOL F 428 | 100.00 |
| Water | 5.00 |
| **Triethylenediamine Catalyst DABCO CRYSTALLINE | 0.9 |
| **Organotin gel Catalyst DABCO 120 | 0.3 |
| Isocyanate | |
| *Isocyanate MDI RUBINATE 7200 | 42 |

*Trademark of ICI Polyurethanes Group of Sterling Heights, Michigan, United States of America
Trademark of Air Products and Chemical, Inc. of Allentown Pennsylvania, United States of America The processing involved with the present invention as performed by the apparatus thereof as previously mentioned is further illustrated in FIGS. 11 and 12 by showing the transitory state 41** when the foam has substantially completed its expansion in less than 25 seconds and preferably less than 15 seconds but has not yet substantially cured so that the compression during such a state causes the collapse that provides the formed laminate with the flexible sheet and also preferably with the liner previously described. Furthermore, testing has also shown that with this quick reacting foam, the formed laminate can be removed from the mold for handling immediately after collapse of the foam. As such, a total cycle time of about 15 seconds can be achieved when the foam utilized has a rise time of about 12 seconds. Complete curing of the formed laminate using such a foam would be on the order of about 15 minutes. This same foam when molded without the compression would require approximately 20 seconds before it could be removed from the mold for handling. Thus, the compression of the foam reduces the cycle time as well as providing the other advantages discussed above.

With further reference to FIGS. 11 and 12, the foamable liquid mixture will expand on the order of about 20 times upon forming the foam prior to being collapsed. After the compression by the mold as previously described, the collapsed foam layer will have a thickness in the range of about $\frac{1}{7}$ to $\frac{1}{5}$ of its fully expanded thickness and normally about $\frac{1}{6}$ of its expanded thickness which is thus about three or four times or so the original volume of the foamable liquid mixture. The collapsed foam thus is about $\frac{2}{3}$ to $\frac{3}{4}$ by volume of gas and the remainder reacted polymer, as opposed to 95% gas and the remainder polymer for normal foams. The collapsed foam will thus have a density in the range of about 0.25 to 0.33 and most normally about 0.30 of the density of water.

While the best mode for carrying out the invention has been described in detail, those familiar with the art to which this invention relates will recognize various alternative modes for practicing the invention as defined by the following claims.

What is claimed is:

1. A method for making a formed laminate comprising:
   depositing a quick reacting foamable liquid mixture onto a rigid transfer member for reaction that causes expansion to provide a foam which subsequently cures but which, after substantial completion of the expansion and before curing has taken place, has a transitory state when the liquid mixture is viscous and defines cells enclosing the gas generated during the expansion stage of the reaction;
   transferring reacted foam and any foamable liquid mixture that has not yet reacted from the transfer member onto a flexible sheet; and
   providing relative movement of a pair of contoured mold surfaces toward each other with the flexible sheet and foam therebetween and without the transfer member therebetween while the foam is in the transitory state such that the foam is collapsed and formed with the flexible sheet to the contoured shapes of the mold surfaces as the collapsed foam is bonded to the flexible sheet to provide the formed laminate.

2. A method for making a formed laminate as in claim 1 wherein the flexible sheet utilized is cloth.

3. A method for making a formed laminate as in claim 1 wherein the foamable liquid mixture is sprayed onto the transfer member.

4. A method for making a formed laminate as in claim 1 wherein a liner is located over the foam after the transfer thereof to the flexible sheet, and the liner as well as the flexible sheet being formed and bonded to the collapsed foam by the contoured mold surfaces.

5. A method for making a formed laminate as in claim 4 wherein the liner extends beyond the foam on the flexible sheet to prevent the subsequently collapsed foam from extending outwardly past the liner.

6. A method for making a formed laminate as in claim 1 wherein printed matter is applied to the flexible sheet before the forming thereof with the foam to provide the formed laminate.

7. A method for making a formed laminate as in claim 6 wherein the printed matter is applied to the flexible sheet by a heat transfer process.

8. A method for making a formed laminate as in claim 1 wherein the flexible sheet is clamped around the foam received thereby with a clamping pressure that permits the flexible sheet to slide at the locations of clamping during the forming thereof by the contoured mold surfaces.

9. A method for making a formed laminate as in claim 1 wherein the transfer member applies a slight pressure to the foam to provide partial collapse thereof against the flexible sheet to facilitate the transfer thereof to the flexible sheet.

10. A method for making a formed laminate as in claim 1 wherein a release agent is applied to the transfer member prior to receiving the foamable liquid mixture to facilitate the transfer of the foam to the flexible sheet.

11. A method for making a formed laminate comprising:

spraying a quick reacting foamable liquid mixture onto a rigid transfer member for reaction that causes expansion to provide a foam which subsequently cures but which, after completion of the expansion and before curing has taken place, has a transitory state when the liquid mixture is viscous and defines cells enclosing the gas generated during the expansion stage of the reaction;

transferring reacted foam and any foamable liquid mixture that has not yet reacted from the transfer member onto a flexible cloth sheet;

locating a liner over the foam after the transfer thereof to the flexible cloth sheet; and providing relative movement of a pair of contoured mold surfaces toward each other with the flexible cloth sheet, the liner and the foam therebetween and without the transfer member therebetween while the foam is still in the transitory state such that the foam is collapsed and formed with the flexible cloth sheet and the liner to the contoured shapes of the mold surfaces as the collapsed foam is bonded to the flexible cloth sheet and to the liner to provide the formed laminate.

12. A method for making a formed laminate comprising:

spraying a quick reacting foamable liquid mixture onto a rigid transfer member for reaction that causes expansion to provide a foam which subsequently cures but which, after substantial completion of the expansion and before curing has taken place, has a transitory state when the liquid mixture is viscous and defines cells enclosing the gas generated during the expansion stage of the reaction;

applying printed matter to a flexible cloth sheet;

clamping the flexible cloth sheet with the printed matter thereon facing downwardly;

transferring reacted foam and any foamable liquid mixture that has not yet reacted from the transfer member downwardly onto the clamped flexible cloth sheet;

locating a liner over and outwardly beyond the foam after the transfer thereof to the flexible cloth sheet; and providing relative movement of a pair of contoured mold surfaces toward each other with the flexible cloth sheet, the liner and the foam therebetween and without the transfer member therebetween while the foam is still in the transitory state such that the foam is collapsed and formed with the flexible cloth sheet and the liner to the contoured shapes of the mold surfaces as the collapsed foam is bonded to the flexible cloth sheet and the liner to provide the formed laminate.

* * * * *